United States Patent
Gabl et al.

(10) Patent No.: US 7,125,491 B2
(45) Date of Patent: Oct. 24, 2006

(54) SCREEN AND PROCESS FOR MANUFACTURING A SCREEN OF THIS KIND

(75) Inventors: Helmuth Gabl, Graz (AT); Axel Pichler, Graz (AT)

(73) Assignee: Andritz AG, Graz (AT)

( * ) Notice: Subject to any disclaimer, the term of this patent is extended or adjusted under 35 U.S.C. 154(b) by 99 days.

(21) Appl. No.: 10/821,831

(22) Filed: Apr. 9, 2004

(65) Prior Publication Data

US 2005/0000891 A1    Jan. 6, 2005

Related U.S. Application Data

(63) Continuation-in-part of application No. 09/776,320, filed on Feb. 2, 2001, now abandoned.

(30) Foreign Application Priority Data

Feb. 3, 2000    (AT)    ............................ A 165/2000

(51) Int. Cl.
*B07B 1/12*    (2006.01)
*B07B 1/18*    (2006.01)

(52) U.S. Cl. ............... 210/497.01; 210/499; 209/395
(58) Field of Classification Search ........... 210/497.01, 210/498, 499; 209/393, 395; 29/896.62
See application file for complete search history.

(56) References Cited

U.S. PATENT DOCUMENTS

| | | | |
|---|---|---|---|
| 212,645 A | 2/1879 | Baumann | |
| 5,090,721 A | 2/1992 | Lange | 220/485 |
| 5,094,360 A | 3/1992 | Lange | 220/485 |
| 5,768,783 A | 6/1998 | Lange | 29/897.15 |
| 6,092,286 A | 7/2000 | Lange | 29/896.62 |

FOREIGN PATENT DOCUMENTS

EP    0 499 154 A1    8/1992

*Primary Examiner*—Matthew O. Savage
(74) *Attorney, Agent, or Firm*—Alix, Yale & Ristas, LLP

(57) ABSTRACT

A flat or cylindrical screen includes rods and rod-bearing supporting elements. The rods have protrusions in the side walls which are received into inversely shaped recesses in a supporting element. The screen is manufactured by bending the supporting elements open elastically and inserting the rods, whereupon the supporting elements spring back, encircle the rods positively and form a screen mat.

10 Claims, 2 Drawing Sheets

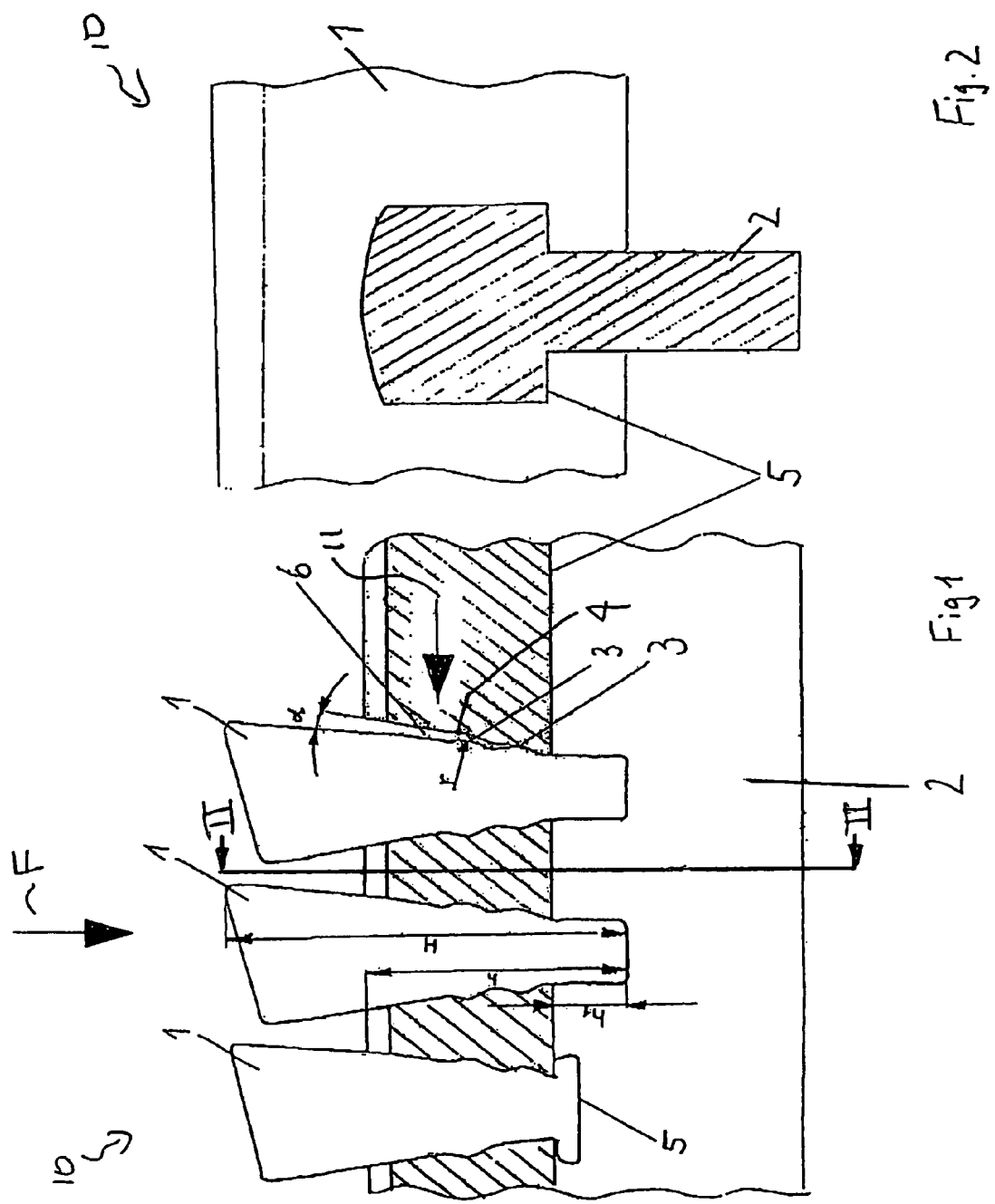

SCREEN AND PROCESS FOR MANUFACTURING A SCREEN OF THIS KIND

CROSS-REFERENCE TO RELATED APPLICATIONS

This application is a continuation-in-part of U.S. patent application Ser. No. 09/776,320 filed Feb. 2, 2001, now abandoned.

BACKGROUND OF THE INVENTION

This invention relates generally to apparatus for cleaning pulp suspensions. More particularly, the present invention relates to screens for cleaning pulp suspensions process for manufacturing screen of this kind Various types of screen are known. For example WO 98/14658 discloses a screen which comprises a number of rods and supporting elements, where the supporting elements have slots. In this case the supporting elements take the shape of a U-shaped profile, which means that part of these rods must undergo plastic deformation in order to secure the rods to the supporting elements. A different kind of screen is known from DE 44 35 538 A1 which discloses rods secured with positive locking by clamping due to plastic deformation of the rod-supporting elements. In addition flat or cylindrical (centripetal or centrifugal) screens are known, where the rods are attached by welding to the rod-supporting elements. This form of fastening, however leads to a series of disadvantages because considerable welding stress is transferred to the components during welding and this causes distortion of the entire screen body. Furthermore, the fastening effect is not always guaranteed because the welds may begin to break up under certain circumstances and in the course of time due to signs of wear. The manufacturing process itself is actually very complicated and time consuming, and it Is very difficult in particular to set the supporting width precisely between two adjacent screen rods.

SUMMARY OF THE INVENTION

The aim of the invention is thus to create a screen that does without plastic deformation of the rods and/or supporting elements and without welds. In addition, a simple manufacturing process for this type of screen is to be developed.

The invention is thus characterized by the rods having protrusions in the side walls which extend into inversely shaped recesses in the supporting element. Thus, a fixed connection can be created with form closure without the need for welding or plastic deformation.

An advantageous further development of the invention is characterized by the protrusions being circular or elliptical and preferably having a radius r of 0.1 mm<r<2 mm. As a result, it is possible to mount the rods easily without deformation of the supporting elements, which also permits manufacture at low cost. The rods can be inserted easily, whereby the circular or elliptical formed protrusions lead to a more even area pressure and therefore to a good fixed connection with the supporting elements.

An advantageous configuration of the invention is characterized by the spacing $h_1$ between the protrusions and the imbedded end of the rod preferably measuring at least 0.1 mm<$h_1$<6 mm. This makes the rod more resistant to vibration.

A favorable configuration of the invention is characterized by three or more protrusions with the respective recesses being provided on one side wall. This means that a secure form closure can be achieved.

A favorable further development of the invention is characterized by a different number of protrusions being provided on either side of the rods. This guarantees a better fastening effect en the event of one-sided inflow.

An advantageous further development of the invention is characterized by the supporting elements having a T or I shape. These shapes provide a larger screen area.

A favorable configuration of the invention is characterized by the rods, which have a total height H, protruding into the supporting element to a height h, where the relationship of h to H is preferably greater than 0.5. This protects the rod more effectively against flow forces.

An advantageous configuration of the invention is characterized by the bottom part of the rod being pressed together with the supporting element. This provides even better stability at higher forces.

The invention also refers to a process for manufacturing a screen of this kind, characterized by the supporting elements being bent open elastically and the rods inserted, whereupon the supporting elements spring back, encircle the rods positively and form a screen mat. Thus, a screen mat can be formed easily without welding or pressing, where it is possible to position the rods exactly and thus, obtain low tolerances.

An advantageous further development of the invention is characterized by the screen mat being rolled together to form a cylinder

BRIEF DESCRIPTION OF THE DRAWINGS

The present invention may be better understood and its numerous objects and advantages will become apparent to those skilled in the art by reference to the accompanying drawings in which:

FIG. 1 is a cross section view of a screen mat in accordance with the invention;

FIG. 2 is a cross section view taken along line II—II of FIG. 1; and

DETAILED DESCRIPTION OF THE PREFERRED EMBODIMENT

Figure 3:
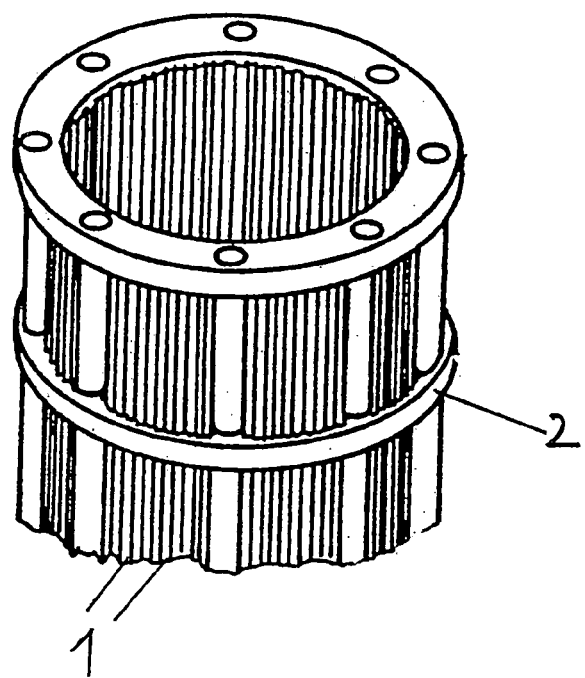
FIG. 3 is a side view of a cylindrical screen basket formed from the screen mat of FIG. 1.

FIG. 1 illustrates an example of three rods 1, mounted in supporting elements 2. The right-hand rod 1 shows that it has several protrusions 3 with a radius r on both side walls. The supporting element contains recesses 4 with exact inverse shaping and the necessary clearance distances in relation to the screen basket diameter. The present illustration shows two protrusions and two recesses on each side, however there can also be three or more such protrusions and recesses if necessary. The number of protrusions on either side may also differ. For example, a first side wall of the rod can define at least one protrusion and a second side wall of the rod can define at least two protrusions as in the case of the left-hand rod of FIG. 1. These protrusions with a circular or elliptical segment shape have a radius r of which 0.1 mm<r<2 mm applies. The rods can be inserted easily, whereby the circular or elliptical formed protrusions lead to a more even area pressure and therefore to a good fixed correction with the supporting elements.

The middle rod in FIG. 1 shows the length measurements of the rod, which has an overall height H. The protrusions are spaced at a distance $h_1$ to which 0.1 mm<$h_1$<6 mm applies, from the imbedded end of the rod. The rod 1 projects into the supporting element with a height h, where the ration of h to H should preferably be larger than 0.5. When the screen mat 10 is rolled to form a cylindrical screen basket, the surfaces 5 of the supporting element 2 are pressed into engagement with the projecting section of the rod on the side, and exert a clamping force 11 on the rod 1 to obtain better fastening. This applies if the supporting element 2 is made in a T shape. If an I shape is used, the rod 1 is not pressed together. The supporting element 2 can also be made in other shapes than a T or I, e.g. square, rectangular, square with rounded corners, rectangular with rounded corners, with the rounding on only one or on several corners.

The the inner surface of the receptacle provided in the supporting element 2 to hold the rod 1 can have clearance with the side wall of the rod equivalent to the angle α. With the cylindrical shape of the screen basket this avoids plastic deformation in the supporting element 2. Clearance angle α has a value of one to ten degrees, preferably two to five degrees. Most commonly, clearance angle α has a value of about five degrees.

FIG. 2 shows a section through the line marked II—II in FIG. 1, where the T shape of the supporting element 2 and one rod 1 are visible. On the surface 5 this rod 1 can be pressed together with the supporting element 2 if necessary.

The rods 1 have a cross-sectional shape that decreases in the direction of flow F. The connection between rods and supporting elements is essentially positive, i.e. without plastic deformation of the individual components or additional connecting links, such as weld seams. A screen of this type can be made, for example, by pressing the rods together with the supporting elements until they lock into place. Another form of manufacture is to bend the supporting elements open elastically so that the receptacle 6 for the rods expand and the individual rods 1 can be inserted. When the supporting elements have sprung back into place, a level (planar) screen mat is formed by the clamped profile rods. Thanks to the above mentioned design as snap connection, this process permits the rods 1 to be inserted precisely into the supporting elements 2, thus lowering the slot width tolerances. If this screen mat is then rolled into a cylindrical screen basket such that the receptacles face an interior of the cylindrical screen basket, the clamping effect is increased further due to the bending radios when the screen is rolled up. Pressing the protruding ends of the rods together with the supporting elements 2 increases the stability of the screen mat further. The supporting elements 2 can also be shaped as rings with the receptacles 6 according to the invention worked into these rings, where the dimensions are somewhat smaller than specified, i.e. the receptacles 6 are slightly smaller than the rods 1. Subsequently the rings are nicked at one point and bent open far enough for the rods to lock into place. When the rings have bent back into place, they can be welded together to form a basket.

The invention is not limited to the examples presented. On the contrary, the protrusions 3 in the rods 1 can be shaped at will as long as they engage in the inversely identical recesses in the supporting element. The rods 1 can also take any shape from a rectangle to a triangle.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A screen comprising
   a plurality of rods, each of the rods having an embedded end and first and second side walls, said first side wall defining at least one protrusion and said second side wall defining at least two protrusions, each protrusion having an elliptic shape or a circular shape having a radius r of 0.1 mm<r<2 mm, all portions of each protrusion being positioned at a distance from the embedded end of the rod; and
   at least one rod-bearing supporting element having a plurality of receptacles, each of the receptacles having an inner surface defining recesses having a shape which is complementary to the protrusions of the rod;
   wherein a portion of each rod is received within a receptacle and each protrusion of the rod is received within a recess of the supporting element whereby the rods and the at least one rod-bearing supporting element form a substantially planar screen mat.

2. The screen according to claim 1 wherein the protrusions are positioned at a distance $h_1$ from the imbedded end of the rod, wherein 0.1 mm<$h_1$<6 mm.

3. The screen according to claim 1 wherein at least one of the rods has three or more protrusions received within recesses in the inner surface of the receptacle of the supporting element.

4. The screen according to claim 1 wherein the first sidewall has a different number of protrusions than the second side wall.

5. The screen according to claim 1 wherein the supporting elements each have a T-shape.

6. The screen according to claim 1 wherein each of the rods has a total height H and an imbedded portion protruding into the supporting element having a height h, where the ratio of h to H is greater then 0.5.

7. The screen according to claim 1 wherein the inner surface of the receptacle defines a clearance angle α with the second side wall of the rod having a value of one to ten degrees.

8. The screen according to claim 7 wherein clearance angle α has a value of two to five degrees.

9. The screen according to claim 7 wherein clearance angle α has a value substantially equal to five degrees.

10. A cylindrical screen basket comprising:
    at least one rod-bearing supporting element having a plurality of receptacles, each of the receptacles having an inner surface defining a plurality of recesses, the at least one rod-bearing supporting element being rolled to define a substantially circular shape such that said receptacles face an interior of said circular shape; and
    a plurality of rods, each of the rods having an embedded end and first and second side walls, said first side wall defining at least one protrusion and said second side wall defining at least two protrusions, each protrusion having an elliptic shape or a circular shape having a radius r of 0.1 mm<r<2 mm, all portions of each protrusion being positioned at a distance from the embedded end of the rod;
    wherein a portion of each rod is received within a receptacle and each protrusion of the rod is received within a recess of the supporting element whereby the rods and the at least one rod-bearing supporting element form a substantially cylindrical screen basket.

* * * * *